(12) United States Patent
Gölzhäuser et al.

(10) Patent No.: US 8,911,852 B2
(45) Date of Patent: Dec. 16, 2014

(54) FULLY CROSSLINKED CHEMICALLY STRUCTURED MONOLAYERS

(75) Inventors: Armin Gölzhäuser, Bielefeld (DE); André Beyer, Bielefeld (DE); Adelheid Godt, Mainz (DE)

(73) Assignee: Universitat Bielefeld, Bielefeld (DE)

( * ) Notice: Subject to any disclaimer, the term of this patent is extended or adjusted under 35 U.S.C. 154(b) by 445 days.

(21) Appl. No.: 13/063,584

(22) PCT Filed: Sep. 10, 2009

(86) PCT No.: PCT/EP2009/006584
§ 371 (c)(1),
(2), (4) Date: Jun. 3, 2011

(87) PCT Pub. No.: WO2010/028834
PCT Pub. Date: Mar. 18, 2010

(65) Prior Publication Data
US 2011/0229699 A1 Sep. 22, 2011

(30) Foreign Application Priority Data
Sep. 11, 2008 (DE) .......... 10 2008 046 707

(51) Int. Cl.
| | | |
|---|---|---|
| B32B 3/10 | (2006.01) |
| G03F 7/20 | (2006.01) |
| B29C 35/08 | (2006.01) |
| B82Y 40/00 | (2011.01) |
| B05D 1/20 | (2006.01) |
| B05D 1/18 | (2006.01) |
| B82Y 30/00 | (2011.01) |
| B05D 1/00 | (2006.01) |
| B05D 1/26 | (2006.01) |
| B05D 3/06 | (2006.01) |

(52) U.S. Cl.
CPC ............. B05D 1/204 (2013.01); B82Y 40/00 (2013.01); B05D 1/005 (2013.01); B05D 1/185 (2013.01); B05D 1/26 (2013.01); B05D 1/60 (2013.01); B82Y 30/00 (2013.01); B05D 3/067 (2013.01)
USPC .......... 428/195.1; 430/296; 264/488

(58) Field of Classification Search
USPC ....................................... 428/195.1
See application file for complete search history.

(56) References Cited

U.S. PATENT DOCUMENTS 6,764,758 B1 * 7/2004 Grunze et al. ............ 428/336
2002/0127491 A1 * 9/2002 Weiss et al. ............ 430/296

OTHER PUBLICATIONS

"Freestanding Nanosheets from Crosslinked Biphenyl Self-Assembled Monolayers," Eck et al., Advanced Materials 2005, 17, p. 2583-2587.*

* cited by examiner

Primary Examiner — Mark Ruthkosky
Assistant Examiner — Ian Rummel
(74) Attorney, Agent, or Firm — Knobbe Martens Olson & Bear LLP

(57) ABSTRACT

The present invention relates to a structured monolayer that is composed of low-molecular aromatics and fully cross-linked in the lateral direction, the monolayer having a pattern of functional groups on one of the two surfaces, and to a method for preparing such a structured monolayer, as well as to the use thereof.

13 Claims, 2 Drawing Sheets

US 8,911,852 B2

FULLY CROSSLINKED CHEMICALLY STRUCTURED MONOLAYERS

CROSS REFERENCE TO RELATED APPLICATIONS

This application is the U.S. National Phase of International Application No. PCT/EP2009/006584, filed Sep. 10, 2009, designating the U.S. and published as WO 2010/028834 on Mar. 18, 2010 which claims the benefit of German Patent Application No. 10 2008 046 707.3 filed Sep. 11, 2008.

FIELD OF THE INVENTION

The present invention relates to a structured monolayer that is composed of low-molecular aromatics and fully cross-linked in the lateral direction, the monolayer having a pattern of functional groups on one of the two surfaces, and to a method for preparing such a structured monolayer, as well as to the use thereof.

BACKGROUND OF THE INVENTION

According to today's prior art, surfaces are mostly protected from corrosive influences and mechanical stress caused by friction by means of physisorbed thin liquid films (e.g. oils, waxes) or polymeric paints applied thereon. These conventional films usually have layer thicknesses in the range of a few micrometers up to millimeters. However, their exact layer thickness is difficult to control in terms of procedure.

Uncross-linked monolayers of the prior art, particularly those on the basis of aliphatic hydrocarbon chains, have a low mechanical stability and thus only provide an insufficient protective effect. Moreover, uncross-linked monolayers desorb upon contact with corrosive agents, since individual molecules at defective sites are displaced from the surface and the detachment of the layer continuous from those sites. Conventional methods for preparing such uncross-linked monolayers of organic molecules on different substrates are e.g. described in more detail in A. Ulman, "An Introduction to Ultrathin Films", Academic Press, Boston 1991, as well as in A. Ulman, *Chem. Rev.* 1996, 96, 1533.

To solve these problems, DE-A-199 45 935 proposes a surface-modified layer system comprising a substrate and, at least partly disposed thereon, a monolayer composed of low-molecular aromatics and/or heteroaromatics, said monolayer being cross-linked in the lateral direction and covalently bonded to at least one surface of the substrate via anchor groups. The monolayer of these layer systems, which is composed of low-molecular aromatics and/or heteroaromatics and is cross-linked in the lateral direction, has the character of a cross-linked solid and thus protects the surfaces of corresponding substrates from being damaged by friction and corrosion. Such systems are particularly suitable for the surface protection of mechanically moved equipment with small working distances in the micro or nanometer range, such as hard disk drives for electronic data storage, or of micromechanical equipment with moved parts having dimensions in the micrometer range or below.

However, the disadvantage of these surface-modified layer systems is that they may have a lateral structure with respect to the cross-linkage by cross-linking with finely focused ionizing radiation or by using shadow masks, but that a monolayer cross-linked in the lateral direction has a uniform or homogenous surface, and thus no surface structure at all. It is therefore not possible to bond further nanoobjects to this cross-linked surface in a specific pattern.

SUMMARY OF INVENTION

Thus, it is the object of the present invention to provide a mechanically stable, two-dimensional, ultrathin layer of cross-linked aromatics and/or heteroaromatics, on the surface of which further nanoobjects, such as macromolecules, functionalized nanoparticles or proteins, can be fixed selectively in an arbitrary pattern.

DETAILED DESCRIPTION OF THE EMBODIMENTS

Figure 1:
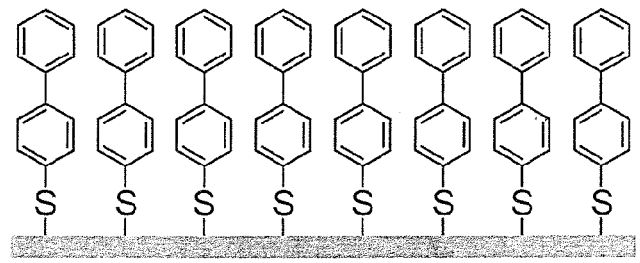
FIG. 1 shows a preferred embodiment of the method according to the invention.
Figure 1:
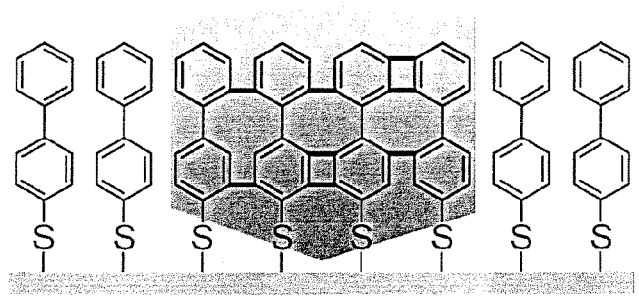
Figure 1:
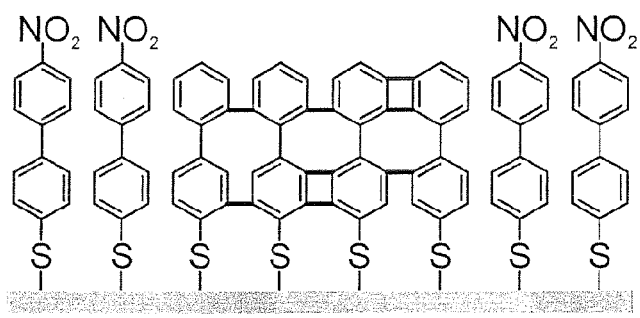
Figure 1:
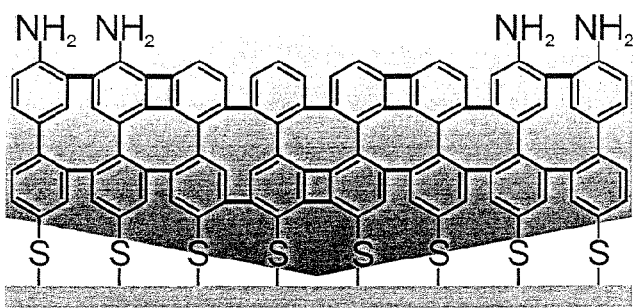

This object is solved by the embodiments characterized in the claims.

There is particularly provided a structured monolayer that is composed of low-molecular aromatics and fully cross-linked in the lateral direction, the monolayer having a pattern of functional groups on one of the two surfaces.

Within the scope of the present invention, the term "low molecular aromatics" designates such aromatic compounds that are not present in an oligomeric or polymeric form. The term further includes the possibility that the aromatics are cross-linked with each other after being treated with high-energy radiation. Within the scope of the present invention, the term "aromatics" also includes the term "heteroaromatics", i.e. the term "aromatics" designates aromatic compounds that do not contain a heteroatom or one or more heteroatoms in at least one aromatic ring. Preferably, the monolayer is composed of aromatics selected from the group consisting of phenyl, biphenyl, terphenyl, naphthalene, anthracene, bipyridine, terpyridine, thiophene, bithienyl, terthienyl, pyrrole, and combinations thereof. In a particularly preferred embodiment of the present invention, the monolayer is composed of biphenyl. This is particularly advantageous with respect to the cross-linkability in the lateral direction. Furthermore, monolayers composed of biphenyl are mechanically extremely stable. It is also possible for the monolayer to contain at least two different aromatics. For example, one area of the monolayer may be composed of biphenyl, while another area of the monolayer is composed of bipyridine.

The monolayer according to the present invention is fully cross-linked in the lateral direction. Due to the cross-linkage in the lateral direction, the monolayer composed of the low molecular aromatics obtains a high mechanical and chemical stability. Preferably, the monolayer is cross-linked by being treated with electron radiation, plasma radiation, X-ray radiation, β radiation, γ radiation, UV radiation or EUV radiation ("extreme UV", with a spectral range between approx. 1 nm and approx. 50 nm).

One of the two surfaces of the monolayer according to the invention has a pattern of functional groups. Within the scope of the present invention, a pattern of functional groups is understood to be a chemical structure of the surface, wherein the functional groups represent this chemical structure thus forming the desired pattern on the surface of the monolayer. This structure or pattern is obtained by partially functionalizing the surface with functional groups. In particular, a monolayer with a target-directed pattern can be obtained from functional groups in this way. Here, the functional groups are each bonded to the aromatics. In contrast, the coating systems of the prior art merely exhibit a full coverage by functional groups without a pattern being formed. It is possible for the coating system of the prior art to have a chemically structured surface with a pattern of functional groups. However, in this case, the monolayer is not fully cross-linked in the lateral direction, resulting in the disadvantage of a reduced mechanical stability.

The functional groups may be all functional groups that are not cleaved off by the irradiation and that are suitable for further reaction, for example to bond further molecules to the monolayer. Preferably, the functional groups are selected from amino groups, nitro groups, carboxy groups, cyano groups, thiol groups, hydroxy groups, and combinations thereof. Particularly preferably, the monolayer has a pattern of amino groups as the functional groups on one of the two surfaces.

The aromatics in the areas where the pattern is formed may be identical with or different from the aromatics in the areas where the pattern is not formed.

Depending on the aromatics used, the monolayer according to the invention can have any suitable thickness. Preferably, the monolayer according to the invention has a layer thickness in the range from 0.1 nm to 10 nm, particularly preferably in the range from 0.3 nm to 3 nm.

In a further preferred embodiment of the present invention, the surface of the monolayer which does not have a pattern of functional groups is covalently bonded to at least one surface of a substrate via anchor groups. In this case, the monolayer is not present freely e.g. in the form of a sheet, but is bonded to a substrate and thus represents a coating or cover. In contrast to the conventional coating systems, e.g. on the basis of physisorbed thin liquid films or polymeric paints, the thickness of the monolayer according to the invention can be controlled or adjusted in an exact manner due to the spatial extension of the molecules that are bonded covalently to the substrate surface via anchor groups and form the monolayer that is cross-linked in the lateral direction. Due to the covalent bonding to the substrate, the monolayer imparts a high mechanical and chemical stability to the substrate and protects the substrate surface effectively from being damaged by friction or corrosive agents.

The substrate used according to the invention has at least one surface and may be composed of any suitable material. Preferably, the substrate is selected from the group consisting of gold, silver, titanium, zirconium, vanadium, chromium, manganese, tungsten, molybdenum, platinum, aluminum, iron, steel, silicon, germanium, indium phosphide, gallium arsenide, silicon nitride, and oxides or alloys or mixtures thereof, as well as indium tin oxide (ITO) and silicate or borate glasses. Particularly preferably, the substrate is silicon coated with gold, which has additionally a titanium primer between the silicon and the gold layer.

If the surface of the substrate material is atomically flat and homogenous, i.e. it does not have any edge dislocations or defects, the protective layer is atomically flat, homogenous and free of defects as well and forms an almost ideally smooth protective film on the substrate surface to be protected. The protective layer adapts almost ideally to the morphology of the substrate. In this way, objects with three-dimensional surface morphologies can be covered with a cross-linked protective layer of a defined thickness as well.

The monolayers according to the invention may also exhibit electrical conductivity by a passage of electrons or holes. This allows the monolayers according to the invention to be used in equipment in which the passage of charge through the surface is to be controlled by a stable protective layer, such as in coated electronic components or electrodes.

All groups that are suitable to bond the low-molecular aromatics covalently to a substrate may serve as anchor groups. Preferably, the anchor groups are selected from the group consisting of carboxy, thiol, trichlorosilyl, trialkoxysilyl, phosphonate, hydroxamic acid, and phosphate groups. In a particularly preferred embodiment, the anchor group is a thiol group. In a preferred embodiment of the present invention, the anchor groups are bonded covalently to the monolayer, which is composed of low-molecular aromatics and is cross-linked in the lateral direction, with the help of a spacer with a length of 1 to 10 methylene groups.

The nature of the anchor groups is to be tailored to the respective substrate material, as it is known to a skilled person. For example, trichloro or trialkoxysilanes, such as trimethoxysilane, triethoxysilane, etc., are particularly suitable as anchor groups for oxidized silicon surfaces. For hydrogenated silicon surfaces, alcohol groups can be used for anchoring. For gold and silver surfaces, thiol groups are suitable as anchor groups, for example, for oxidized metal surfaces, such as iron or chromium, phosphonic acids, carboxylic acids, or hydroxamic acids are suitable.

In a particularly preferred embodiment of the present invention, the structured monolayer comprises a monolayer composed of biphenyl units, which is covalently bonded to the corresponding substrate surface, such as gold or silver surfaces, via thiol groups as anchor groups.

In a further preferred embodiment, the monolayer according to the invention may, in the areas where the surface does not have a pattern of functional groups, carry further functional groups selected from halogen atoms, carboxy, trifluoromethyl, cyano, thiol, hydroxy, or carbonyl groups, provided that they are different from the functional groups that form the pattern. Thus, a structured monolayer is provided, the surface of which exhibits a full coverage with functional groups, wherein the pattern is formed by functional groups of one type, while the rest of the surface has a type of functional groups different therefrom.

Moreover, the present invention relates to a method for preparing a structured monolayer that is composed of low-molecular aromatics and is fully cross-linked in the lateral direction, the monolayer having a pattern of functional groups on one of the two surfaces, the method comprising the steps of:
(a) providing a substrate,
(b) optionally modifying at least one surface of the substrate,
(c) applying a monolayer of low-molecular aromatics to at least one, optionally modified surface of the substrate by bonding via anchor groups,
(d) treating the substrate obtained in step (c) with high-energy radiation such that the monolayer that is composed of low-molecular aromatics is selectively cross-linked in the lateral direction in specific areas thus forming a pattern, whereby a monolayer with cross-linked and uncross-linked areas is formed,
(e) treating the substrate obtained in step (d) with low-molecular aromatics having at least one functional group such that an exchange of the uncross-linked low-molecular aromatics for low-molecular aromatics having at least one functional group takes place, and
(f) treating the substrate obtained in step (e) with high-energy radiation such that a cross-linking of the exchanged aromatics having at least one functional group takes place among one another and with the aromatics cross-linked in step (d).

The substrate to be provided in step (a) has at least one surface and may be composed of any suitable material. Preferably, the substrate is selected from the group consisting of gold, silver, titanium, zirconium, vanadium, chromium, manganese, tungsten, molybdenum, platinum, aluminum, iron, steel, silicon, germanium, indium phosphide, gallium arsenide, silicon nitride, and oxides or alloys or mixtures thereof, as well as indium tin oxide (ITO) and silicate or borate glasses. Particularly preferably, the substrate is silicon coated with gold, which has additionally a titanium primer between the silicon and the gold layer.

In order to subsequently bond a monolayer of low-molecular aromatics covalently to the substrate via anchor groups, the substrate surface in step (b) of the method according to the invention can be optionally modified in advance. The modification may comprise a chemical modification and/or cleaning. Cleaning may be performed by simply rinsing the surface with water or organic solvents, such as ethanol, acetone, or dimethylformamide, or by a treatment with oxygen plasma created by UV radiation. Particularly preferably, a treatment with UV radiation is conducted first, followed by rinsing with ethanol and subsequent drying in a stream of nitrogen. If the monolayers are to be applied to oxidized metal surfaces with anchor groups, such as phosphonic acid, carboxylic acid, or hydroxamic acid groups, a prior controlled oxidation of the metal surface is advantageous. It may be achieved by treating the metal surface with oxidizing agents, such as hydrogen peroxide, Caro's acid, or nitric acid. A further possibility of modifying a substrate surface is to apply a first organic monolayer with terminal reactive groups, such as amino, hydroxy, chloro, bromo, carboxy, or isocyanate groups, to which the monolayer to be actually cross-linked is chemically coupled in a second step by means of suitable functional groups.

Subsequently, in step (c) of the method according to the invention, a monolayer of low-molecular aromatics is applied to at least one, optionally modified surface of the substrate using bonding via anchor groups. Preferably, the monolayer is applied to the surface of the substrate by covalent bonding via anchor groups. Applying the monolayer may be performed using dipping, casting, or spin-coating methods, or by adsorption from solution. Such methods are known from the prior art. Preferably, there is applied a monolayer of aromatics selected from the group consisting of phenyl, biphenyl, terphenyl, naphthalene, anthracene, bipyridine, terpyridine, thiophene, bithienyl, terthienyl, pyrrole, and combinations thereof. In a particularly preferred embodiment of the present invention, the aromatic is biphenyl, which is covalently bonded to the substrate via a thiol group.

Within the scope of the present invention, the term "aromatics having at least one functional group" designates such aromatics that have at least one functional group. The functional group may be any functional group that is not cleaved off by the subsequent irradiation and that are suitable for further reaction, for example to bond further molecules to the monolayer. Preferably, the functional groups are selected from amino groups, nitro groups, carboxy groups, cyano groups, thiol groups, hydroxy groups, and combinations thereof. Particularly preferably, the functional group is a nitro group. In a further preferred embodiment of the present invention, the low-molecular aromatics have the functional group in a terminal position such that the functional groups are on the surface of the monolayer after formation thereof.

In contrast, within the scope of the present invention, the term "aromatics" designates such aromatics that do not have a functional group or have at least one functional group selected from halogen atoms, carboxy, trifluoromethyl, cyano, thiol, hydroxy, or carbonyl groups, provided that they are different from the above-mentioned functional groups that form the pattern. However, it is preferred that these aromatics do not have functional groups and merely represent unsubstituted aromatics.

In step (d) of the method according to the invention, the substrate obtained in step (c) is treated with high-energy radiation such that the monolayer that is composed of low-molecular aromatics is selectively cross-linked in the lateral direction in specific areas thus forming a pattern. A monolayer with cross-linked and uncross-linked areas is formed thereby. Preferably, the monolayer is cross-linked covalently in the lateral direction. In this method step, only one specific area of the monolayer is selectively irradiated to thereby only cross-link this area in the lateral direction. In this way, a structure or a pattern is obtained on the surface of the monolayer. The non-irradiated area, however, remains uncross-linked. Preferably, irradiation is performed with electron radiation, plasma radiation, X-ray radiation, $\beta$ radiation, $\gamma$ radiation, UV radiation or EUV radiation.

For example, the selective cross-linking may be carried out thus forming a structure by means of finely focused ionizing electron, ion, or photon radiation. Focusing and scanning of the beam across the areas to be structured may be performed by electron-optical or ion-optical elements, such as in electron beam lithography with scanning electron microscopes or in lithography with focused ions (FIB). Preferably, the selective irradiation is performed by means of electron lithography, X-ray lithography, or EUV lithography. Preferably, structuring may also be performed by means of local probe processes. Here, the focusing of electrons, ions, or photons is ensured by the small size of the electron, ion, or photon source (local probe). The local probe is then guided across the areas to be structured in distances between 0.1 nm and 1000 nm. Particularly suitable local probes for electrons include the tips of scanning tunneling microscopes (STM), atomic force microscopes (AFM), and atomically defined field emitter tips, which e.g. have been produced using the method described in Müller et al., *Ultramicroscopy* 1993, 50, 57. The latter are particularly suitable as local probes for structuring at larger distances (>10 nm) between the probe and the sample, and can also be used as field ion sources. Fine tips made of glass or another photon-conducting material, as are used in nearfield optical microscopes (SNOM), are suitable for structuring with photons. In all local probe methods, the local probe is positioned directly over the areas to be exposed by means of a positioning device, for example one made of piezoceramic elements. In a particularly preferred embodiment, the selective cross-linking is performed using a local probe method selected from the group consisting of STM, AFM, and SNOM.

In a further preferred embodiment of the method according to the invention, the treatment with high-energy radiation is carried out using a shadow mask such that only spatially defined areas of the monolayer applied to the substrate surface are irradiated, whereby a structured surface is formed on the substrate. For cross-linking with lateral structuring by means of electromagnetic radiation (e.g. X-ray radiation, UV radiation, EUV radiation), light sources available in the prior art in conjunction with masks suitable for the respective wavelength range, or scanning by means of suitable light guides are possible. In a further preferred embodiment of the method according to the invention, structuring is performed using a large-area illuminating electron source in conjunction with a shadow mask, so that only the open areas are exposed to the electrons.

In step (e) of the method according to the invention, the substrate obtained in step (d) is treated with low-molecular aromatics having at least one functional group such that an exchange of the uncross-linked low-molecular aromatics for low-molecular aromatics having at least one functional group takes place. In a preferred embodiment, the low-molecular aromatics used in step (e) have at least one functional group in contrast to the low-molecular aromatics used in step (c). In another preferred embodiment, both the low-molecular aromatics used in step (e) and the low-molecular aromatics used in step (c) have at least one functional group, these functional groups being different though. In this way, a pattern is provided on the surface of the structured monolayer as well.

The treatment may be performed using dipping, casting, or spin-coating methods, or by adsorption from solution. Preferably, the solution is a dilute solution. In another preferred embodiment of the present invention, the treatment is performed by adsorption from the gas phase. Preferably, there is an excess of low-molecular aromatics having at least one functional group, which are used in step (e), in relation to the uncross-linked aromatics on the substrate to be exchanged, to thus facilitate the exchange of the uncross-linked aromatics. For example, the monolayer selectively cross-linked in step (d) is preferably placed in a highly concentrated solution of other functionalized aromatics in order to carry out the exchange. Preferably, aromatics selected from the group consisting of phenyl, biphenyl, terphenyl, naphthalene, anthracene, bipyridine, terpyridine, thiophene, bithienyl, terthienyl, pyrrole, and combinations thereof are used for the exchange. These aromatics each have at least one functional group as substituent. Apart from the functional group, the aromatics may be identical with or different from the aromatics used in step (c). In a particularly preferred embodiment of the present invention, 4'-nitrobiphenyl-4-thiol is used for the exchange, wherein bonding to the substrate surface is carried out via the thiol group. The mechanism of the exchange is described in A. Turchanin et al., *Appl. Phys. Lett.* 2007, 90, 053102, for example.

In step (f) of the method according to the invention, the high-energy radiation treatment of the substrate obtained in step (e) is performed such that a cross-linking of the exchanged aromatics having at least one functional group takes place among one another and with the aromatics cross-linked in step (d).

In a preferred embodiment, a selective irradiation of the areas not irradiated before can be carried out, as described above for step (d). In another preferred embodiment, the irradiation in this step is performed for a large area, i.e. the entire area of the substrate is irradiated. Preferably, irradiation is performed with electron radiation, plasma radiation, X-ray radiation, β radiation, γ radiation, UV radiation or EUV radiation.

Figure 2:
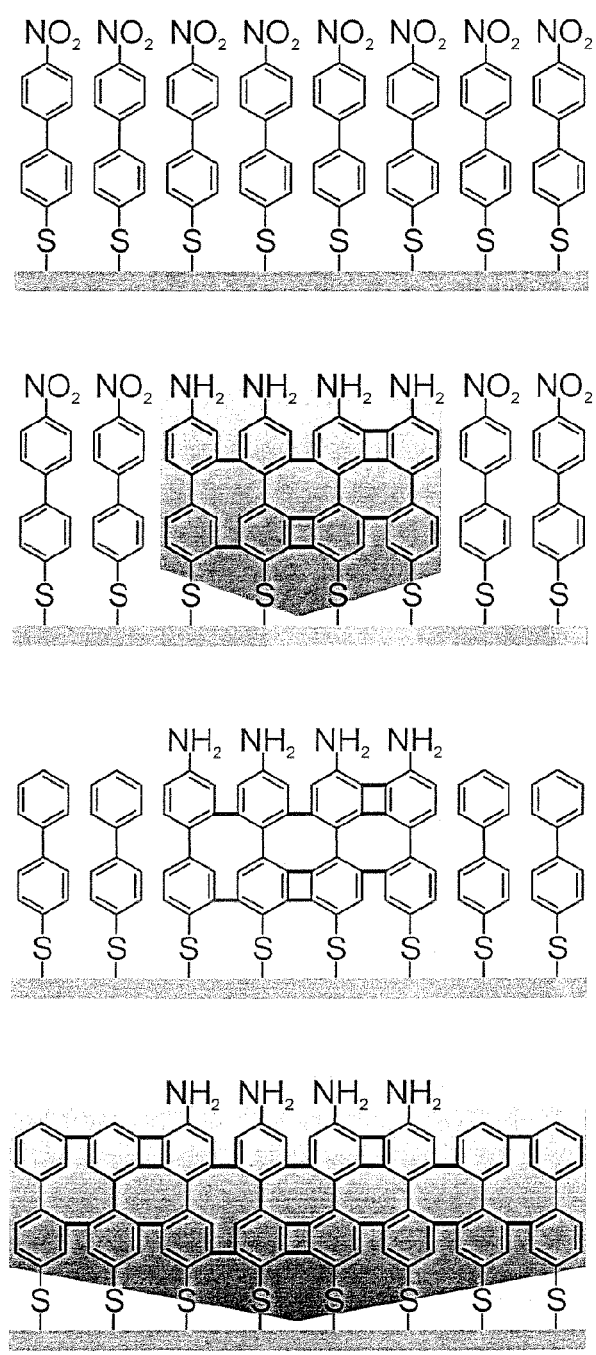
FIG. 2 shows another preferred embodiment of the method according to the invention.

In a preferred embodiment of the method according to the invention, a large-area illuminating electron source, e.g. a "flood gun", or a construction as described in FIG. 2 of Hild et al., *Langmuir* 1998, 14, 342-346 can be used for the irradiation with electrons. The electron energies used can be adapted to the respective organic films and their substrates over a broad range, preferably 1 to 1000 eV. For example, electron radiation of 50 eV can be used for cross-linking biphenyl-4-thiol on gold.

For large-area cross-linking by means of electromagnetic radiation (e.g. X-ray radiation, UV radiation, EUV radiation), light sources available in the prior art can be used.

If in step (c) and/or (e), instead of applying a monolayer of low-molecular aromatics, for example saturated molecules or units that are covalently bonded to the substrate surface by means of an anchor group are applied, said molecules or units including cyclohexyl, bicyclohexyl, tercyclohexyl, partially or fully hydrogenated naphthalenes or anthracenes, or partially or fully hydrogenated heteroaromatics, then dehydrogenation to the corresponding aromatics or heteroaromatics can be performed in addition to cross-linking in the lateral direction by way of a treatment with high-energy radiation in steps (d) and (f).

According to a preferred embodiment of the method according to the invention, the functional groups are nitro groups. In this case, the nitro groups are further converted to amino groups by irradiation of the substrate with high-energy radiation in step (f). It is assumed that this reduction is preceded by a C—H-bond cleavage in the aromatics and that the released hydrogen atoms subsequently reduce the nitro groups to amino groups.

In a further preferred embodiment, the monolayer obtained by the method according to the invention may, in the areas where the surface does not have a pattern of functional groups, carry further functional groups selected from halogen atoms, carboxy, trifluoromethyl, cyano, thiol, hydroxy, or carbonyl groups, provided that they are different from the functional groups that form the pattern. To this end, aromatics having at least one of these other functional groups can be used in step (c) of the method according to the invention.

Depending on the aromatic used, the monolayer according to the invention can have any suitable thickness. Preferably, the monolayer according to the invention has a layer thickness in the range from 0.1 nm to 10 nm, particularly preferably in the range from 0.3 nm to 3 nm.

In a preferred embodiment, after step (f), the method according to the invention further comprises the step (g) of removing the substrate to obtain a structured monolayer that is not bonded to a substrate. This may be achieved by dissolving the substrate by etching-away, or by chemically cleaving the bond between the monolayer and the substrate via the anchor group. Corresponding methods for removing the substrate from the monolayer are known from the prior art. If a thiol group is used as an anchor group, this may be achieved, for example, by a treatment with iodine (cf. for example W. Eck et al., *Adv. Mater.* 2005, 17, 2583-2587).

After the removal of the substrate, the structured monolayer is not present in the form of a coating, but in the form of a sheet or in the form of a membrane, for example. In particular, it is possible to detach the monolayer as a chemically structured nanomembrane from the substrate surface.

A preferred embodiment of the method according to the invention will be explained in FIG. 1 in more detail. Here, a substrate surface is first of all coated with a monolayer by being treated with biphenyl-4-thiol, and the monolayer is selectively cross-linked by electron bombardment thus forming a structure. This is followed by an exchange of the uncross-linked biphenyl-4-thiols for 4'-nitrobiphenyl-4-thiols. A second irradiation leads to the chemical conversion of the nitro groups to amino groups, to a cross-linking of the exchanged areas, and to a bonding with the areas cross-linked during the first irradiation process.

Moreover, the present invention relates to a method for preparing a structured monolayer that is composed of low-molecular aromatics and is fully cross-linked in the lateral direction, the monolayer having a pattern of functional groups on one of the two surfaces, the method comprising the steps of:

(a) providing a substrate,
(b) optionally modifying at least one surface of the substrate,
(c) applying a monolayer of low-molecular aromatics, which have at least one functional group, to at least one, optionally modified surface of the substrate by bonding via anchor groups,
(d) treating the substrate obtained in step (c) with high-energy radiation such that the monolayer that is composed of low-molecular aromatics is selectively cross-linked in the lateral direction in specific areas thus forming a pattern, whereby a monolayer with cross-linked and uncross-linked areas is formed,
(e) treating the substrate obtained in step (d) with low-molecular aromatics such that an exchange of the uncross-linked low-molecular aromatics, which have at least one functional group, for low-molecular aromatics takes place, and
(f) treating the substrate obtained in step (e) with high-energy radiation such that a cross-linking of the exchanged aromatics takes place among one another and with the aromatics having at least one functional group and cross-linked in step (d).

Just like the method according to the invention explained before, this method leads to structured monolayers, the order of the method steps having been changed slightly though. In this method, a monolayer of low-molecular aromatics having at least one functional group is first of all applied in step (c), and only then are the uncross-linked aromatics, which have at least one functional group, exchanged for low-molecular aromatics in step (e). However, the latter method has the advantage that if nitro groups are used as functional groups, the exchange in step (e) of the method is performed approximately three times as fast and thus the production process is faster.

A preferred embodiment of this method according to the invention will be explained in FIG. 2 in more detail. Here, a substrate surface is first of all coated with a monolayer by being treated with 4'-nitrobiphenyl-4-thiol, and the monolayer is selectively cross-linked by electron bombardment thus forming a structure. A chemical conversion of the nitro groups to amino groups takes place here as well. This is followed by an exchange of the uncross-linked 4'-nitrobiphenyl-4-thiols for biphenyl-4-thiols. In this case as well, a second irradiation leads to a cross-linking of the exchanged areas and to a bonding with the areas cross-linked during the first irradiation process.

The present invention further relates to the use of the structured monolayer according to the invention as a membrane. In this case, the monolayer is not bonded to a substrate. Due to the fully cross-linked, chemically structured layers the application possibilities of cross-linked monomolecular membranes are increased (also referred to as "nanosheets"), which are described, for example, in W. Eck et al., Adv. Mater. 2005, 17, 2583-2587. In particular, the membranes can be produced in a chemically structured manner by means of the method according to the invention, and can thus be used directly as slides in transmission electron microscopy and X-ray microscopy for the localized immobilization of molecules and cells, and also as slides in X-ray microscopy by digital in-line holography (DM) for the localized immobilization of molecules and cells.

In addition, the fully cross-linked, chemically structured monolayers according to the invention can be used in the production of nano-microphones, nano-electromechanical systems (NEMS) with nanosheet, objects with freestanding nanosheets, covers of openings in arbitrary materials with freestanding nanosheets, coatings of arbitrary materials with cross-linked layers, corrosion protection with cross-linked layers, templates for biochips for the localized bonding of individual proteins, production of nano-biochips on arbitrary substrates, and for the transfer of structured, self-aggregating monolayers (such as nanoribbons or nanocircles).

Thus, the monolayer according to the invention provides a mechanically stable, two-dimensional, ultrathin layer of cross-linked aromatics, on the surface of which patterns of functional groups are present, which are suitable for the bonding of nanoobjects. The dimensions of these patterns may be varied arbitrarily from the macroscopic to the nanometer range.

Therefore, the present invention further relates to the use of the structured monolayer according to the invention for selectively bonding nanoobjects via the functional groups of the monolayer. The nanoobjects may be all suitable objects or molecules that can be bonded to the monolayer via a functional group. Preferably, the nanoobjects are macromolecules, functionalized nanoparticles, or proteins. Particularly preferably, proteins, antibodies, gold nanoparticles, DNA, polymer beads and/or dye molecules are used as nanoobjects for bonding. It is particularly preferred that the functional groups are amino groups.

FIG. 1 shows a preferred embodiment of the method according to the invention.

FIG. 2 shows another preferred embodiment of the method according to the invention.

The present invention will be further explained by the following non-limiting examples.

EXAMPLES

Both methods for preparing structured monolayers according to the invention have been used as follows:

Substrate:
Silicon with a titanium primer (9 nm) and a gold layer of 30 nm obtained from G. Albert PVD (Silz, Germany) was used as the substrate. The substrate was cleaned in an UV cleaner (UVOH 150 LAB by FHR, Germany) for 3 minutes, rinsed with ethanol, and dried in a stream of nitrogen.

Ultrasonic Treatment:
All ultrasonic treatment steps were carried out in an Elma Transsonic T310 unit for 3 minutes.

Preparation of the Monolayers:
The gold substrates were immersed in a 10 mM solution of 4'-nitro-1,1'-biphenyl-4-thiol (NBPT, obtained from Taros Chemicals) or 1,1'-Biphenyl-4-thiol (BPT, obtained from Platte Valley Scientific) in N,N-dimethylformamide (DMF, p.a., obtained from VWR, dried with 0.4 nm molecular sieve) for 3 days at room temperature. Subsequently, the sample was rinsed with DMF and treated with ultrasound in DMF, rinsed with ethanol (p.a., obtained from VWR), and finally dried in a stream of nitrogen.

Electron Exposition:
A flood gun (Specs FG20) was used for cross-linking. The electron exposition was carried out in a high vacuum ($<5 \cdot 10^{-7}$ mbar) with an electron energy of 100 eV. An electron dose of 20 mC/cm$^2$ was applied. The dose was measured with a Faraday cup at a small distance from the sample. A carbon foil (Multi A, Quantifoil Micro Tools, Jena, Germany) with circular and elliptical openings of 1 to 8 μm on a transmission electron microscope grid as a carrier was used as a stencil mask.

Thiol Exchange:
Samples with partially cross-linked monolayers of NBPT or BPT were immersed in a 10 mM solution of BPT and NBPT, respectively, in dry DMF for 1 hour to 3 days at 55° C.

After rinsing with DMF and ultrasonic treatment in DMF, followed by rinsing with ethanol and subsequent drying in a stream of nitrogen, the entire sample was exposed to 100 eV electrons with a dose of 40 mC/cm$^2$.

Derivatization:

Monolayers with amino-terminated areas were immersed in a solution of 1,2-dichloroethane (SPECTRANAL®, ACS reagent, obtained from Sigma-Aldrich) with 3.8% by volume of pentanoic acid chloride (obtained from Sigma-Aldrich) and 1.3% by volume of N-Ethyl-N,N-diisopropylamine (obtained from Sigma-Aldrich) for 2.5 hours. Subsequently, the samples were rinsed with 1,2-dichloroethane and dried in a stream of nitrogen.

X-Ray Photoelectron Spectroscopy (XPS):

XP spectra were obtained with an Omicron multi-sample spectrometer using monochromatic Al Kα radiation. The spectra were calibrated to 84.0 eV by adjusting the Au 4 f signal.

Atomic Force Microscopy (AFM):

AFM images obtained with an NT-MDT Ntegra in the contact mode using silicon carriers with a force constant of 0.1 N/m.

The preparation of a fully cross-linked, chemically patterned monolayer is schematically shown in FIGS. 1 and 2.

In the method according to FIG. 2, a monolayer of 4-nitro-1,1'-biphenyl-4-thiol (NBPT) was formed on a gold surface. Subsequently, a localized electron exposition led to the intermolecular cross-linking and conversion of the nitro groups to amino groups within the exposed areas. When the substrate coated with the monolayer was immersed in a solution of 1,1'-biphenyl-4-thiol (BPT) in DMF, the NBPT molecules in the uncross-linked areas were replaced by BPT molecules, whereby a BPT monolayer was formed in this area. An electron exposition of the entire surface resulted in the cross-linking of the BPT monolayer thus forming additional cross-linkage between the amino areas and the non-functionalized BPT areas.

Alternatively, a pattern according to the method of FIG. 1 was obtained, wherein it was started with BPT monolayers and BPT was exchanged for NBPT after the first electron exposition. A final electron exposition of the entire surface resulted in the cross-linking of the NBPT monolayers and the conversion of the nitro groups to amino groups, and the bonding of the cross-linked amino-terminated NBPT areas and the non-functionalized BPT areas.

The individual method steps were each monitored by means of X-ray photoelectron spectroscopy (XPS), wherein it was found that the exchange of the uncross-linked aromatics was about three times faster if a monolayer of NBPT was prepared first, and the uncross-linked NBPT was replaced by BPT (method according to FIG. 2), in comparison to the reverse method in which first of all a monolayer of BPT was prepared and the uncross-linked BPT was replaced by NBPT (method according to FIG. 1).

The structure of the obtained monolayers having a pattern was documented by atomic force microscopy. For example, it has been shown that after the conversion of the amino groups with pentanoic acid chloride with amide formation, the functionalized areas are approx. 10 Å higher than the surface of the adjacent non-functionalized areas.

What is claimed is:

1. A freestanding structured monolayer comprising low-molecular aromatics and being fully cross-linked in the lateral direction, the monolayer having a pattern of functional groups on one of the two surfaces, obtained by a method comprising:
   (a) providing a substrate,
   (b) optionally modifying at least one surface of the substrate,
   (c) applying a monolayer of low-molecular aromatics or applying a monolayer of low-molecular aromatics comprising at least one functional group to at least one, optionally modified surface of the substrate by bonding via anchor groups,
   (d) treating the substrate obtained in step (c) with high-energy radiation such that the monolayer comprising low-molecular aromatics is selectively cross-linked in the lateral direction in specific areas thus forming a pattern, whereby a monolayer with cross-linked and uncross-linked areas is formed,
   (e) treating the substrate obtained in step (d) with low-molecular aromatics comprising at least one functional group such that an exchange of the uncross-linked low-molecular aromatics for low-molecular aromatics comprising at least one functional group takes place, or
   treating the substrate obtained in step (d) with low-molecular aromatics such that an exchange of the uncross-linked low-molecular aromatics, which comprises at least one functional group, for low-molecular aromatics takes place, and
   (f) treating the substrate obtained in step (e) with high-energy radiation such that a cross-linking of the exchanged aromatics comprising at least one functional group takes place among one another and with the aromatics cross-linked in step (d), or such that a cross-linking of the exchanged aromatics takes place among one another and with the aromatics comprising at least one functional group and cross-linked in step (d), and optionally
   (g) removing the substrate to obtain a structured monolayer that is not bonded to a substrate.

2. The structured monolayer according to claim 1, wherein the monolayer has a pattern of amino groups as the functional groups on one of the two surfaces.

3. The structured monolayer according to claim 1, wherein the monolayer comprises aromatics selected from the group consisting of phenyl, biphenyl, terphenyl, naphthalene, anthracene, bipyridine, terpyridine, thiophene, bithienyl, terthienyl, pyrrole, and combinations thereof.

4. The structured monolayer according to claim 1, wherein the surface of the monolayer which does not have a pattern of functional groups is covalently bonded to at least one surface of a substrate via anchor groups.

5. The structured monolayer according to claim 4, wherein the substrate is selected from the group consisting of gold, silver, titanium, zirconium, vanadium, chromium, manganese, tungsten, molybdenum, platinum, aluminum, iron, steel, silicon, germanium, indium phosphide, gallium arsenide, silicon nitride, and oxides or alloys or mixtures thereof, as well as indium tin oxide (ITO) and silicate or borate glasses.

6. The structured monolayer according to claim 4, wherein the anchor groups are selected from the group consisting of carboxy, thiol, trichlorosilyl, trialkoxysilyl, phosphonate, hydroxamic acid, and phosphate groups.

7. The structured monolayer according to claim 4, wherein the anchor groups are bonded covalently to the monolayer with the help of a spacer with a length of 1 to 10 methylene groups.

8. A method for preparing the freestanding structured monolayer according to claim 1, the method comprising:
   (a) providing a substrate,
   (b) optionally modifying at least one surface of the substrate, (c) applying a monolayer of low-molecular aromatics to at least one, optionally modified surface of the substrate by bonding via anchor groups, (d) treating the substrate obtained in step (c) with high-energy radiation such that the monolayer comprising low-molecular aromatics is selectively cross-linked in the lateral direction in specific areas thus forming a pattern, whereby a monolayer with cross-linked and uncross-linked areas is formed, (e) treating the substrate obtained in step (d) with low-molecular aromatics comprising at least one functional group such that an exchange of the uncross-linked low-molecular aromatics for low-molecular aromatics comprising at least one functional group takes place, and (f) treating the substrate obtained in step (e) with high-energy radiation such that a cross-linking of the exchanged aromatics comprising at least one functional group takes place among one another and with the aromatics cross-linked in step (d), (g) removing the substrate to obtain a structured monolayer that is not bonded to a substrate.

9. A method for preparing the freestanding structured monolayer according to claim 1, the method comprising:
(a) providing a substrate,
(b) optionally modifying at least one surface of the substrate,
(c) applying a monolayer of low-molecular aromatics comprising at least one functional group to at least one, optionally modified surface of the substrate by bonding via anchor groups,
(d) treating the substrate obtained in step (c) with high-energy radiation such that the monolayer comprising low-molecular aromatics is selectively cross-linked in the lateral direction in specific areas thus forming a pattern, whereby a monolayer with cross-linked and uncross-linked areas is formed,
(e) treating the substrate obtained in step (d) with low-molecular aromatics such that an exchange of the uncross-linked low-molecular aromatics, which comprises at least one functional group, for low-molecular aromatics takes place, and
(f) treating the substrate obtained in step (e) with high-energy radiation such that a cross-linking of the exchanged aromatics takes place among one another and with the aromatics comprising at least one functional group and cross-linked in step (d),
(g) removing the substrate to obtain a structured monolayer that is not bonded to a substrate.

10. The method according to claim 8 or 9, wherein the aromatic is biphenyl, which is covalently bonded to the substrate via a thiol group as the anchor group.

11. The method according to claim 8 or 9, wherein the selective irradiation in step (d) is performed by electron lithography, X-ray lithography, EUV lithography, and/or a local probe.

12. The method according to claim 8 or 9, wherein in step (c) the application may be performed by dipping, casting, spin-coating methods, or by adsorption from solution, and/or in step (e) the treatment is performed by dipping, casting, spin-coating methods, or by adsorption from solution or from the gas phase.

13. A membrane or nanosheet comprising the structured monolayer of claim 1.

* * * * *